Figure 1:
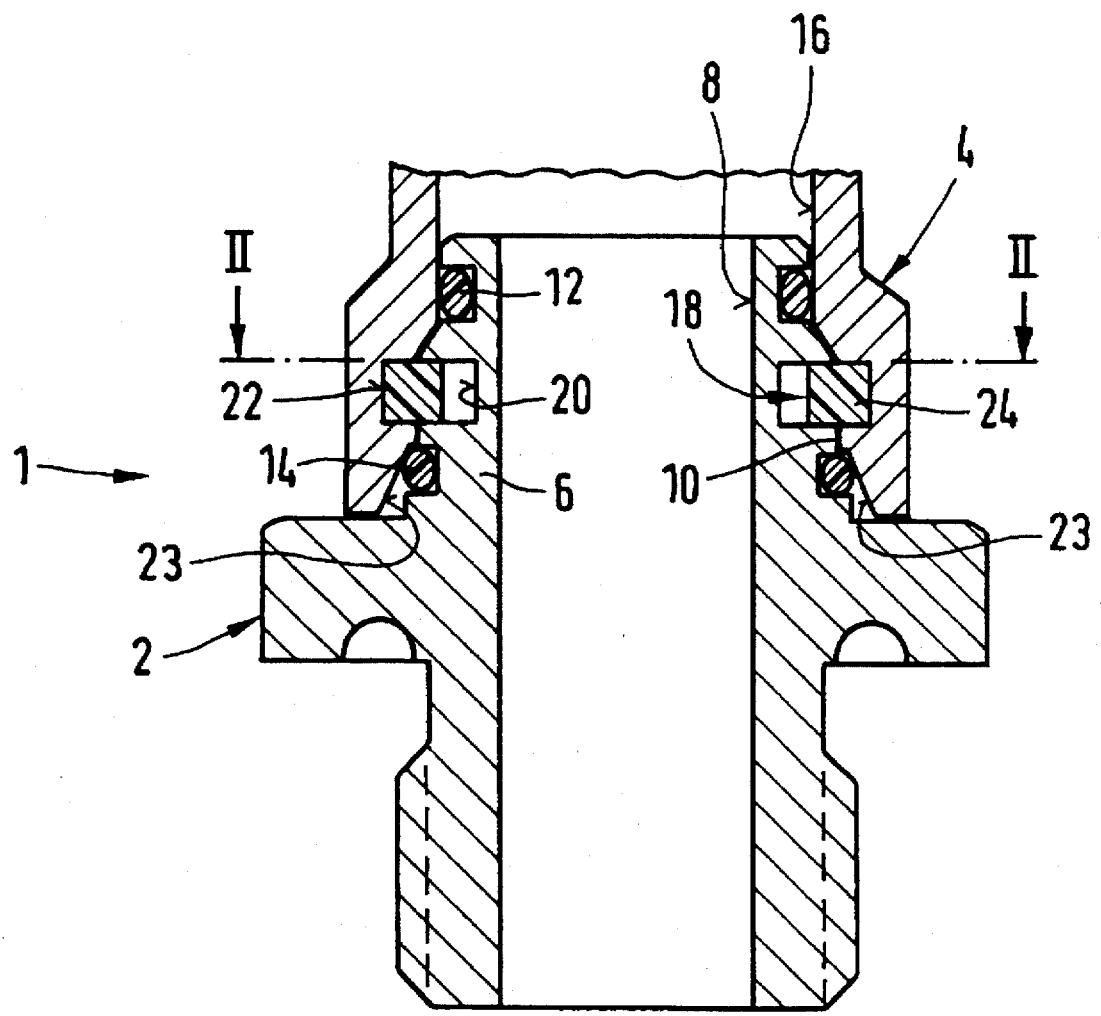

United States Patent [19]

Berg et al.

[11] Patent Number: 5,681,060
[45] Date of Patent: Oct. 28, 1997

[54] PLUG-IN CONNECTOR FOR A PRESSURE PIPE SYSTEM

[75] Inventors: Manfred Berg; Bernd Goller, both of Wipperfurth, Germany

[73] Assignee: Armaturenfabrik Hermann Voss GmbH & Co., Wipperfurth, Germany

[21] Appl. No.: 758,978

[22] Filed: Dec. 2, 1996

Related U.S. Application Data

[63] Continuation of Ser. No. 380,027, Jan. 30, 1995, abandoned.

[30] Foreign Application Priority Data

Jan. 29, 1994 [DE] Germany ............... 9401501 U

[51] Int. Cl.$^6$ ............................................. F16L 37/088
[52] U.S. Cl. ..................... 285/305; 285/321; 411/353
[58] Field of Search .......................... 285/305, 321; 411/353, 517, 518

[56] References Cited

U.S. PATENT DOCUMENTS

| | | | |
|---|---|---|---|
| 738,503 | 9/1903 | Waters | 285/321 |
| 2,886,355 | 5/1959 | Wurzul | 285/321 |
| 3,352,576 | 11/1967 | Thorne-Thomsen | 285/321 |
| 3,773,360 | 11/1973 | Timbers | 285/321 |
| 3,948,548 | 4/1976 | Voss | 285/321 |
| 3,987,697 | 10/1976 | Wurzel | 411/313 |
| 4,126,335 | 11/1978 | Voss | 285/321 |
| 4,226,445 | 10/1980 | Kramer | 285/321 |
| 4,640,534 | 2/1987 | Hoskins et al. | 285/321 |
| 5,211,427 | 5/1993 | Washizu | 285/321 |
| 5,399,053 | 3/1995 | Duran | 411/353 |

FOREIGN PATENT DOCUMENTS

| | | |
|---|---|---|
| 294503 | 10/1971 | Austria . |
| 0005865 | 12/1979 | European Pat. Off. . |
| 1062499 | 1/1961 | Germany . |
| 3313859 | 12/1983 | Germany . |
| 3341029 | 5/1985 | Germany . |
| 3424437 | 1/1986 | Germany . |

*Primary Examiner*—Eric K. Nicholson
*Attorney, Agent, or Firm*—Jones & Askew, LLP

[57] ABSTRACT

A connector having a plug part insertable in a sealing and locking manner into a receiver opening of a socket part. An annular retaining element is preassembled into a ring groove of one of the connector parts, prior to insertion. The retaining element is deformable in a radially elastic manner during the insertion process so that the sealing element is pressed into the ring groove, and the retaining element then deforms in an elastic manner into a locking position to engage a ring groove of the other connector part. The retaining element corresponds at least approximately in longitudinal and transverse cross section to the longitudinal and transverse cross sections of the first-mentioned ring groove, at least over two diametrically-opposed regions of the circumference of that ring groove.

6 Claims, 3 Drawing Sheets

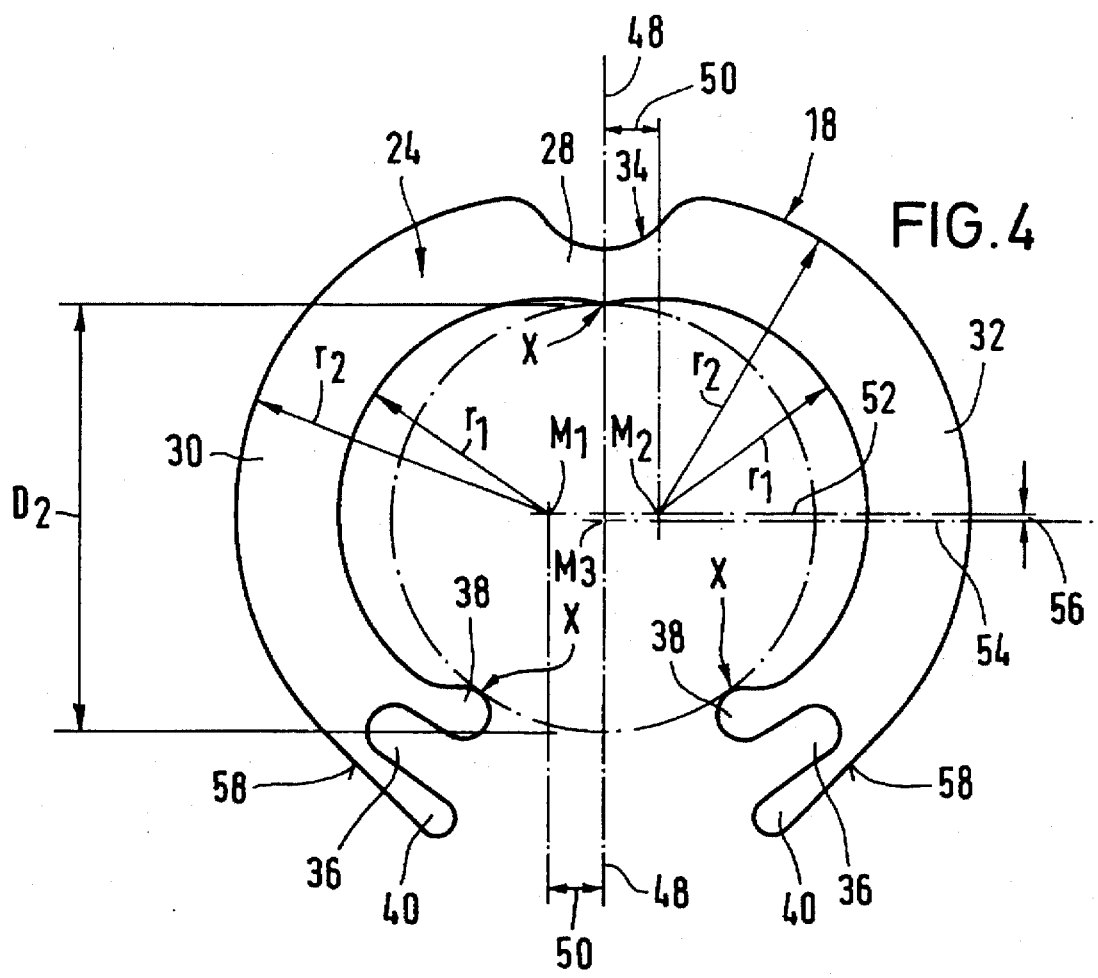
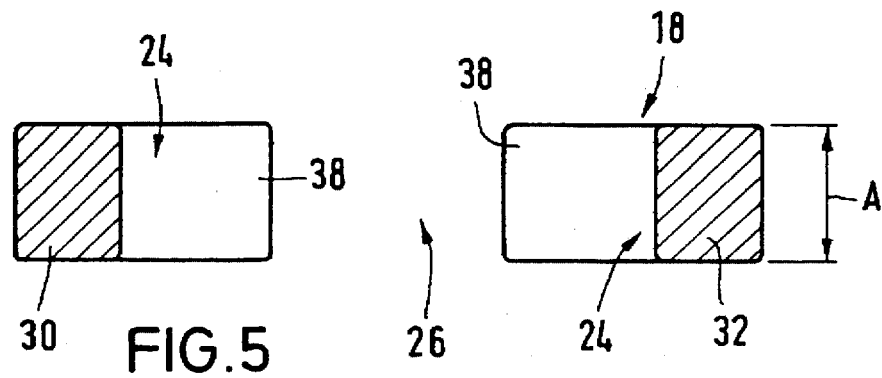

5,681,060

PLUG-IN CONNECTOR FOR A PRESSURE PIPE SYSTEM

This is a continuation of application Ser. No. 08/380,027 filed Jan. 30, 1995, now abandoned.

FIELD OF THE INVENTION

The present invention pertains to a plug-in connector for a pressure pipe system, consisting of two connector parts, that is, a plug part and a socket part, where the plug part can be inserted with a plug shaft in a sealing manner into a receiver opening of the socket part and can also be locked in place in the receiver opening by means of an essentially annular retaining element that is deformable in a radially elastic manner, with the retaining element being preassembled into a ring groove of one of the connector parts prior to the insertion process in such a way that during the insertion process the former is pressed into this ring groove by means of radially elastic deformation and then deforms again in an elastic manner into a locking position in which it also engages areas of a ring groove of the other connector part.

For a first plug-in connector of this general type, adequately known through prior use, a round wire snap ring is preassembled as a retaining element in an outer ring groove of the plug part. During the insertion process, this snap ring is to deform in a radially elastic manner inward into the ring groove of the plug-in shaft by means of resting on the inner circumference of the receiver opening, which is chamfered on the interior of the open side in order to form an insertion cone, until it thus reaches the area of a radially opposed inner ring groove of the socket part in an axial direction and then also engages areas of this ring groove of the socket part by means of a spring-elastic deformation. This known plug-in connector cannot be reliably inserted by hand due to the round wire snap ring, as, on the one hand, this requires a high level of force and, on the other hand, inserting the plug into the socket is at least frequently hindered, if not made impossible in practice by the snap ring being displaced in an eccentric direction from the ring groove. In addition, the snap ring, due to its circular wire cross section (longitudinal section in the direction of the connector axis) only brings a relatively slight force to bear in the locking position, such that a sufficiently secure locking is not insured for any arbitrary application.

Another plug-in connector of this general class is known from European Patent No. 0,005,865. Here, a radially elastic slotted retaining ring is preassembled as a retaining element into an inner ring groove (ring groove) of the socket or housing part, with centering of the retaining ring with respect to the connector axis being provided either by a three-point contact between the outer circumference of the retaining ring and the base of the ring groove or else by a circumferential circular contact. This known plug-in connector is already very well proven in practice, but is not equally well suited to all applications with respect to the retention force generated with the retaining ring.

Starting from the state of the art described, the underlying purpose of the invention is thus to create a plug-in connector of the general type which can be inserted easily and securely even by hand that, at the same time, however, is securely locked in place in the inserted state against high axial forces.

This is achieved in accordance with the invention in that the retaining element is configured as a molded spring clip designed in such a way that it essentially fills the corresponding ring groove (in which it is preassembled prior to insertion) in the insertion process. This signifies that the molded spring clip, in its deformed state within the ring groove, at least approximately corresponds in longitudinal and transverse cross section to the longitudinal and transverse cross section of the ring groove. Because the ring groove is preferably configured as a rectangular groove with a cylindrical base practically coaxial to the connector axis and two groove walls perpendicular to this, the molded spring clip of the invention also possesses an essentially rectangular contour of the longitudinal section (the section in the direction of the connector axis). It is advantageous if the molded spring clip fills the ring groove in the manner described over, at least approximately, the entire circumference, but at least over two diametrically opposed regions of the circumference, each amounting to at least 90°, preferably approximately 120° –160° respectively, hence, a total of, preferably, approximately 240° –320° of the "full" circumference of 360°.

Consequently, the invention advantageously achieves a "maximizing" of the cross-sectional area of the retaining element defining the level of axial retention force because the upper boundary of this cross-sectional area comes from the annular cross-sectional area of the snap groove receiving the retaining element in the insertion process and the outer circumference of the plug shaft and the inner circumference of the receiver opening—seen apart from an annular gap required precisely for insertion—coincide at least approximately, i.e., possess essentially the same diameter, because the retaining element is required to completely "spread out" in a radial direction far enough that the socket part and the plug part can be moved relative to one another in an axial direction (relative movement between the circumferential areas of the plug shaft and the receiver opening).

It is, in addition, of a particular advantage in conjunction with the invention if the molded spring clip is preassembled in the ring groove in a self-centering manner, for which purpose a three-point contact is provided at the base of the ring groove. This assures—preferably with complete independence from the fitting position of the plug-in connector in accordance with the invention—that the connector can be easily inserted by hand, as the molded spring clip is always positioned centered or coaxial to the connector axis, such that it can always be "displaced" by a pilot cone of one of the two connector parts into the corresponding ring groove.

The invention is suitable both for plug-in connectors, for which the retaining element is preassembled in an outer ring groove of the plug shaft, as well as also for those plug-in connectors for which the retaining element is mounted within an inner ring groove of the socket part.

Additional advantageous design features of the invention are contained in the subclaims as well as in the following description.

Figure 2:
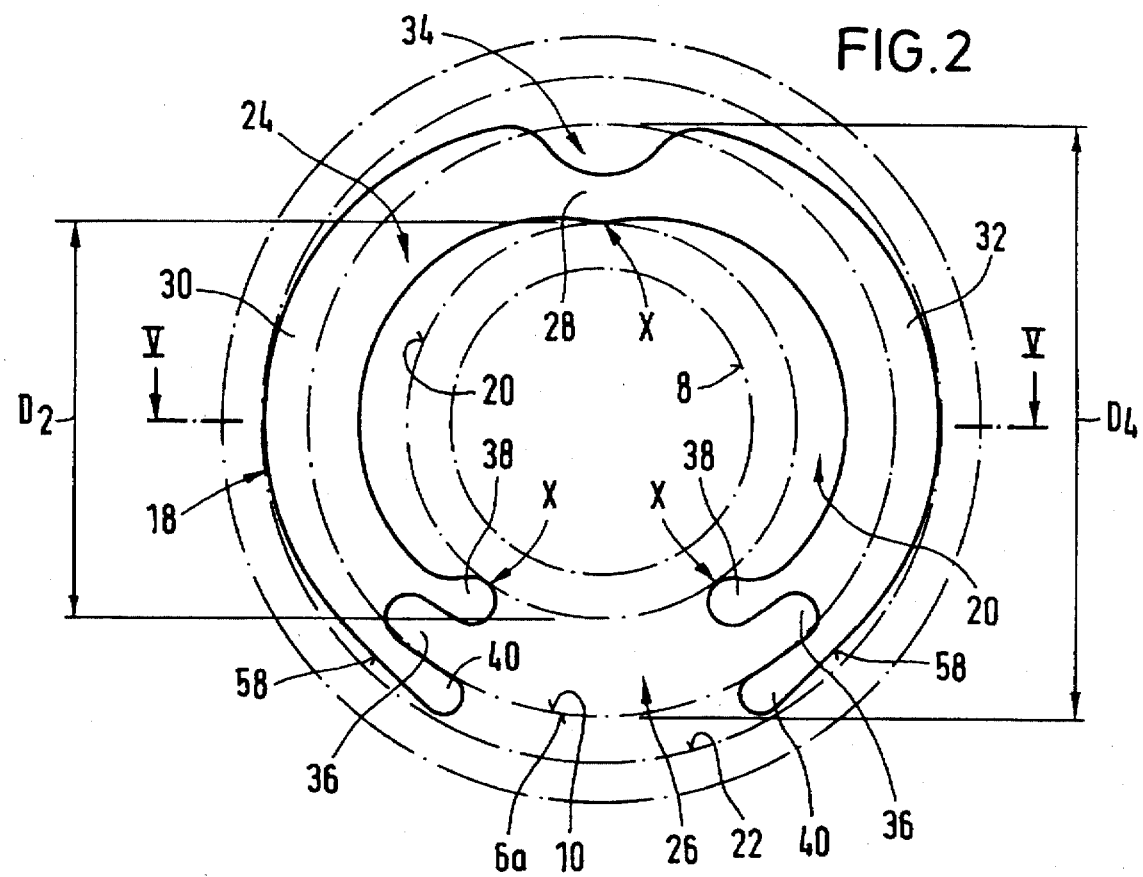
Figure 3:
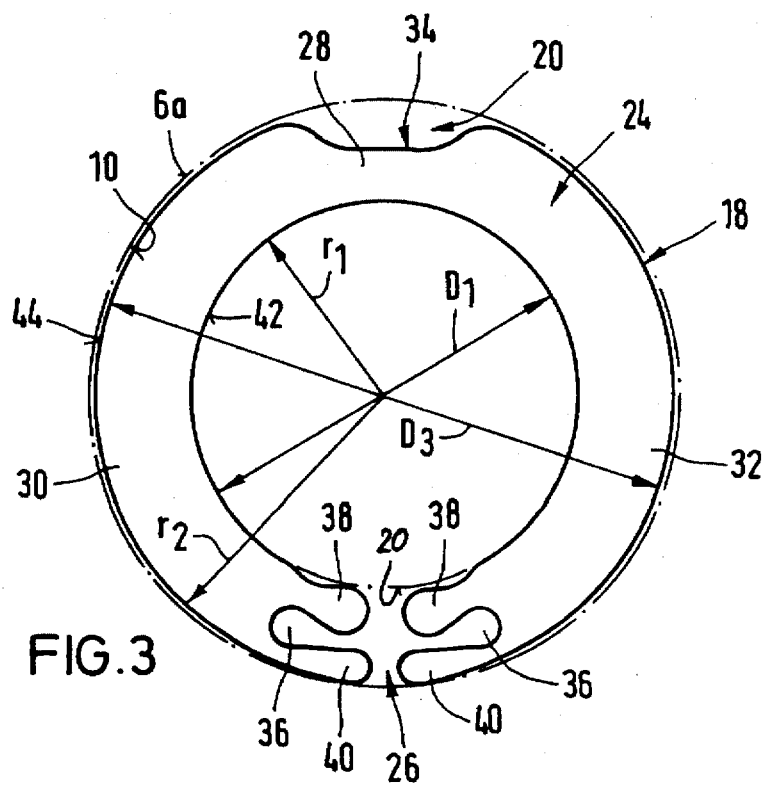

The invention will be more closely explained with the aid of a particularly advantageous embodiment example illustrated in the drawing. The figures show:

FIG. 1: an axial section through a plug-in connector in accordance with the invention;

FIG. 2: an enlarged top view of the retaining element of the plug-in connector in accordance with the invention along the cutting plane II—II as in FIG. 1 with the different circumferential contours of the plug-in connector in the locking region of the retaining element indicated and the locking position of the latter illustrated;

FIG. 3: a top view of the retaining element in accordance with the invention, analogous to FIG. 2, but with the position deformed in a radially elastic manner and with only the contours of the ring groove receiving the retaining element indicated;

FIG. 4: for the purpose of further explaining the geometry of the retaining element in accordance with the invention, a representation analogous to FIG. 2, illustrating the fully relaxed position of the retaining element not elastically deformed; and FIG. 5: an axial section of the retaining element in accordance with the invention along the cutting plane V—V according to FIG. 2.

In the different figures of the drawing, like parts are always provided with the same reference numbers such that any description of a part even appearing only once applies in an analogous manner with respect to the other figures of the drawing as well in which this part can likewise be recognized with the corresponding reference number.

As can first be seen from FIG. 1, a plug-in connector (1) in accordance with the invention is composed of two connector parts, namely, of a plug part (2) and a socket part (4). The plug part (2) generally features an essentially cylindrical plug shaft (6) with an axial channel (8) for a pressurized medium and the socket part (4) possesses at least one receiver opening (10), in which the plug shaft (6) can be inserted in a sealing manner. The inner circumference of the receiver opening (10) approximately corresponds to the outer circumference (6a) of the plug shaft (6), for which reason also, a circle is drawn only with a dash-dotted line with respect to this in FIGS. 2 and 3, respectively. Two axially displaced sealing rings (12,14) that are respectively mounted in one ring groove of the plug shaft (6) are provided in the embodiment example represented in order to seal the circumference. The receiver opening (10) of the socket part (4) graduates into a pressurized agent channel (16) such that the channel (8) of the plug part (2) can be connected to the pressurized agent channel (16) of the socket part (4) by means of the plug-in connector (1). In particular, the socket part (4) can be optionally configured as a distributor, e.g., as a T-branch (not more closely represented). The plug part (2) is configured as a screw-in adapter in the example depicted.

The plug part (2) or the plug shaft (6) can be locked in place in its inserted position in the receiver opening (10) by means of an essentially annular retaining element (18) that is deformable in a radially elastic manner and is preferably axially arranged between the two sealing rings (12,14). This retaining element (18) is preassembled prior to the insertion process in a ring groove of one of the connector parts, and, in fact in the preferred embodiment example represented, in an outer ring groove (20) of the plug shaft (6) in such a manner that it is pressed (cf. FIG. 3) in the insertion process by means of radially elastic deformation into this ring groove (20) and then is deformed again in an elastically springing manner in a locking position (compare FIGS. 1, 2 and 4), in which it also engages areas of a ring groove of the other connector part in the example represented, in an inner ring groove (22) of the socket part (4). The elastic deformation is first caused by means of an inner conical area (23) of the socket part (4), the former of which expands the receiver opening (10) to practically form a "pilot funnel."

In accordance with the invention, the retaining element (18) is configured as a single-piece molded spring clip (24) consisting, in particular, of plastic (POM=abbreviation for polyoxymethylene or polyacetals, which are particularly suitable) and designed, with respect to the shape of the circumference and to the longitudinal and cross-sectional shape and also with respect to the elastic deformation behavior resulting from this, such that in the insertion process—see FIG. 3—the molded spring clip (24) almost completely fills the ring groove (20). This signifies that the molded spring clip (24) fills the ring groove (20) in the insertion process over an amount at least approaching the entire circumference in a radial direction, preferably however, also in an axial direction. The ring groove (20) is preferably configured as a rectangular groove with a cylindrical base, level in the axial section, and two groove walls perpendicular to the former (not provided with reference numbers in the drawing figures). This is why the cross section of the molded spring clip (24) of the invention also features a corresponding rectangular contour over the greater part of its circumference, which can clearly be recognized in FIGS. 1 and 5.

As can now be seen, particularly in FIGS. 2–4, the molded spring clip (24) is advantageously composed of two spring arms (30,32) separated at the ends by means of a slot (26) and connected to one another by means of an annular region lying diametrically opposite the slot (26) and contracted to form a spring hinge (28) by this means. The contraction forming the spring hinge (28) is formed, in particular, by means of a recess (34) formed on the outer circumference and preferably of a concave circular arc shape, according to FIGS. 2 and 4. Each spring arm (30,32) preferably possesses a circular-arc-shaped inner and outer contour essentially corresponding to the ring groove (20) with respect to its inner and outer contour. The spring arms (30,32) are, however, spread with an enlargement of the slot (26) in the relaxed position of the molded spring clip (24) that is not elastically deformed (see FIGS. 2 and 4). During the insertion process the two spring arms (30,32) are then pressed together with elastic deformation in the region of the spring joint (28) until they reach the position illustrated in FIG. 3, filling out the groove (20). Here, the spring arms (30,32) themselves are practically not deformed, rather, deformation occurs in the main point in the region of the spring joint (28). This affords the spring arms (30,32) an unusually high level of stability in order to absorb a very high level of retention force.

The spring arms (30,32) featuring a rectangular sectional contour (compare FIG. 5) extend, starting from the spring hinge (28), in the direction of the circumference at least across a range of approximately 90° respectively, in particular, however, across a range of approximately 120° –160°.

In a particularly advantageous development of the invention, each spring arm (30,32) of the molded spring clip (24) features two spring tongues (38,40), deformable in a radially elastic manner, at its open end region, formed by means of a slotted recess (36) extending approximately in the circumferential direction in the spring arm (30 or 32) and passing completely, although in the axial direction. In the relaxed, not elastically deformed state of the molded spring clip (24) (see FIGS. 2 and 4) these two spring tongues (38,40) are respectively spread apart from one another in such a way that the inner spring tongues (38) are arranged in the ring groove (20) of the plug shaft (6) and the outer spring tongues (40) are arranged in the inner ring groove (22) of the socket part (4). During the insertion process (see FIG. 3) the spring tongues (38,40) are pressed together under elastic deformation and are also pressed into the groove (20). Consequently, the spring tongues (38,40) contribute to an additional increase of the axial retention force by means of spreading apart into the locking position.

In conjunction with the invention, it is also particularly advantageous if the molded spring clip (24) is preassembled in the ring groove (20) in a self-centering manner, for which purpose a three-point contact is preferably provided at the base of the ring groove (20) (see in particular FIG. 2). As in the preferred embodiment example represented, the molded spring clip (24) is preassembled in the outer ring groove (20) of the plug shaft (6), three contact points (X) for the preferred self-centering, are provided between the inner circumference of the molded spring clip (24) and the base of the ring groove (20) of the plug shaft; in particular, one contact point (X) is provided in the region of the spring joint (28) and one contact point (X) is provided in the open end region of each spring arm (30,32), with said contact points (X) each preferably being arranged in the region of the spring tongue (38) located radially inward. This three-point contact changes, however, during the insertion process to a circular or cylindrical contact conforming to the circumference (see FIG. 3). This signifies that during the insertion process the molded spring clip (24) features, on one side, an essentially circular inner contour (42), the diameter ($D_1$) of which is at least approximately equal to the diameter ($D_2$) (see FIG. 2) of the base of the ring groove (20) of the plug shaft. In addition, the molded spring clip possesses, during the insertion process, an essentially circular outer contour (44), the diameter ($D_3$) of which is at least approximately equal to the inner diameter ($D_4$) of the receiver opening (10) of the socket part. Here, the inner diameter ($D_4$) of the receiver opening (10) approximately corresponds to the outer diameter of the plug shaft (6), for which reason the latter is shown in the drawing only as a circular dash-dotted line (FIGS. 2 and 3).

With the help of FIG. 4, the geometric shape of the molded spring clip (24) in accordance with the invention will now be explained more precisely. FIG. 4 illustrates the relaxed, not elastically deformed state in an elastic sense of the molded spring clip (24). Each spring arm (30,32) features a circular inner contour with a radius ($r_1$) as well as a circular outer contour with a radius ($r_2$). The radius of curvature ($r_1$) corresponds to that of the base of the ring groove (20) of the plug shaft (6) and the radius of curvature ($r_2$) corresponds to the curvature of the receiver opening (10) of the socket part (4) or to the outer circumferential surface of the plug shaft (6). The two radii ($r_1$) and ($r_2$) of the two spring arms (30,32) originate, however, from two different center points ($M_1$) and ($M_2$), where these two center points ($M_1$) and ($M_2$) are respectively arranged to be displaced from the connector axis, drawn in FIG. 4 as the center point ($M_3$). On one hand, each center point ($M_1$) and ($M_2$), starting from an axis of symmetry (48) progressing through the center point ($M_3$)—and through the center of the spring joint (28)—is displaced perpendicular to this axis of symmetry (48) in an outward direction, i.e., away from one another, by an offset (50). On the other hand, both center points ($M_1$) and ($M_2$) lie on a straight line (52) that is displaced in parallel by an offset (56) in comparison to the straight line (54) progressing perpendicular to the axis of symmetry (48) through the center point ($M_3$). Here, the first offset (50) and the second offset (56) are respectively designed in such a way that after the radially elastic deformation, all center points ($M_1$–$M_3$) are located practically upon one another—see FIG. 3. The inner contour of each spring arm (30,32) extends with the radius ($r_1$), preferably in the direction of the spring joint (28) up to the axis of symmetry (48), such that the inner contours form the first contact point (X) in this intersection with the axis of symmetry (48). In the other circumferential direction, the inner radius ($r_1$) of each spring arm (30,32) graduates by means of a smaller radius to the inner spring tongue (38), such that this yields the two additional contact points (X) in this region. On the outer side, each outer radius ($r_2$) of each spring arm (30,32) graduates in the region of the outer spring tongue (40) into a section (58) featuring a straight line, where the spring tongue (40), however, can be deformed corresponding to the circular inner contour of the receiver opening (10) (cf. FIG. 3).

In the following, the most important features of the plug-in connector (1) in accordance with the invention will be indicated through the use of an example, without however, limiting the invention to this realized embodiment.

The diameter of the base of the ring groove (20) amounts to approximately 7.8 mm. In this connection, the first offset (50) preferably amounts to approximately 1 mm and the second offset (56) measures approximately 0.1 mm. Here, the radius ($r_1$) amounts to approximately 3.9 mm and the radius ($r_2$) amounts to approximately 5.8 mm. The thickness (A) of the molded spring clip (24), measured in an axial direction (compare FIG. 5), amounts to approximately 2.5 mm.

The invention is not limited to the embodiment example represented and described in a concrete manner, but rather, also comprises all embodiments operating in the same way in the sense of the invention. In particular, it is to be reemphasized that the molded spring clip (24) can absolutely also be preassembled in the inner ring groove (22) of the socket part (4), where in this case the three point contact for the purpose of self-centering would need to be provided at the outer circumference of the molded spring clip (24).

We claim:

1. A plug-in connector for a pressure pipe system, comprising:

two connector parts, namely, a male plug part and a female socket part;

the plug part having a plug shaft insertable in a sealing manner into a receiver opening of the socket part and lockable in place in the receiver opening by operative engagement with a substantially annular retaining element comprising a molded spring clip that is deformable in a radially elastic manner, the molded spring clip being preassembled into a first ring groove of one of the connector parts in a self-centering manner having a three-point contact at a base of the first ring groove, prior to said insertion;

the molded spring clip for that purpose comprising two spring arms separated at their ends by means of a slot and connected to one another by means of a spring hinge lying diametrically opposed to the slot, with each spring arm possessing a circular-arc-shaped inner and outer contour substantially corresponding to inner and outer contours of the ring groove, whereby during insertion the retaining element is pressed into the first ring groove by means of radial elastic deformation of the spring hinge while the two spring arms themselves are substantially undeformed, and upon complete insertion the spring hinge returns in an elastic manner to a locking position in which the retaining element also engages areas of a second ring groove of the other connector part; and said spring clip, in its elastically deformed condition in the first ring groove during said insertion, corresponding at least approximately in longitudinal and transverse cross section to the longitudinal and transverse cross section of the first ring groove at least over two diametrically opposed regions of the circumference of the first ring groove, each region amounting to substantially 120° to 160°, and both regions thus amounting to a total of substantially 240° to 320° of the full circumference of 360°, whereby the spring clip substantially fills out the longitudinal and transverse cross section of the first ring groove throughout said circumferential regions during insertion.

2. A plug-in connector as in claim 1, characterized in that the molded spring clip features, at least in the region of the spring arms, an axial sectional contour corresponding to the axial sectional contour of the ring groove, with each spring arm featuring this axial sectional contour across a circumferential area of approximately 120°–160°.

3. A plug-in connector as in claim 1, characterized in that each spring arm of the molded spring clip features two spring tongues that are deformable in a radially elastic manner at its open end region, formed by means of a slotted recess extending approximately in the circumferential direction in the spring arm and passing completely though in the axial direction.

4. A plug-in connector as in claim 1, characterized in that the molded spring clip is preassembled in the ring groove of the plug shaft where, for the purpose of self-centering, three contact points are provided between the inner circumference of the molded spring clip and the base of the ring groove of the plug shaft; one said contact point is provided in the region of the spring hinge and another contact point is provided in an open end region of each spring arm in the region of a radially inward spring tongue.

5. A plug-in connector as in claim 4, characterized in that during the insertion process the molded spring clip features, on a one on side, an essentially circular inner contour, the diameter ($D_1$) of which is at least approximately equal to the diameter ($D_2$) of the base of the ring groove of the plug shaft as well as possessing, on the other side, an essentially circular outer contour, the diameter ($D_3$) of which is at least approximately equal to the inner diameter ($D_4$) of the receiver opening of the socket part.

6. A plug-in connector as in claim 1 characterized in that the molded spring clip is constructed as a single-piece molded part of plastic material.

* * * * *